United States Patent [19]

Sulzyc

[11] Patent Number: 5,176,404
[45] Date of Patent: Jan. 5, 1993

[54] LEVEL CONTROL VALVE FOR AUTOMATICALLY KEEPING CONSTANT THE VEHICLE HEIGHT OF A COMMERCIAL VEHICLE

[75] Inventor: Jercy Sulzyc, Eppelheim, Fed. Rep. of Germany

[73] Assignee: Grau GmbH, Heidelberg, Fed. Rep. of Germany

[21] Appl. No.: 684,026

[22] Filed: Apr. 11, 1991

[30] Foreign Application Priority Data

Apr. 14, 1990 [DE] Fed. Rep. of Germany ....... 4012251

[51] Int. Cl.⁵ ............................................. B60G 11/26
[52] U.S. Cl. .................................. 280/840; 280/714; 137/102; 137/627.5
[58] Field of Search ............. 280/840, 6.1, 6.11, 280/711, 714, 672; 137/102, 627.5; 180/41

[56] References Cited

U.S. PATENT DOCUMENTS

| 3,087,743 | 4/1963 | Behles ................... | 280/714 |
| 4,809,957 | 3/1989 | Schonfeld et al. ....... | 280/6.1 |

FOREIGN PATENT DOCUMENTS

| 2630511 | 1/1978 | Fed. Rep. of Germany ...... 137/102 |
| 3013305 | 10/1981 | Fed. Rep. of Germany ...... 280/714 |
| 3445579 | 6/1986 | Fed. Rep. of Germany . |
| 3716436 | 2/1989 | Fed. Rep. of Germany . |
| 628328 | 11/1961 | Italy ............................ 280/6.1 |

Primary Examiner—Margaret A. Focarino
Assistant Examiner—Tamara L. Graysay
Attorney, Agent, or Firm—Hopkins & Thomas

[57] ABSTRACT

A level control valve for automatically keeping constant the vehicle height of a commercial vehicle with air suspension has a spring-loaded double valve body 22, an inlet seat 24 on the housing 2 and a hollow valve tappet 11 which bears an outlet seat 25 for the double valve body 22, is displaceable in a sealing manner, and the position of which relative to the housing 2 can be changed via an adjustment drive which senses the vehicle height. There is at least one port 6, provided on the housing 2, for a line 7 leading to an air suspension bellows 8 and a port 3 for a storage line 4 leading to the inlet valve 22, 24. The level control valve 1 has a shutoff and outlet valve 36, which can be controlled arbitrarily and independently of the adjustment drive and is of large cross-section, for the rapid lowering of the vehicle structure. For each line 7 leading to an air suspension bellows 8, a bypass line 45 is provided which leads from said line 7 to the shutoff and outlet valve 36 of large cross-section, in which bypass line there is arranged a non-return valve 46 which opens in the direction of the shutoff and outlet valve 36.

9 Claims, 3 Drawing Sheets

LEVEL CONTROL VALVE FOR AUTOMATICALLY KEEPING CONSTANT THE VEHICLE HEIGHT OF A COMMERCIAL VEHICLE

FIELD OF THE INVENTION

The invention relates to a level control valve for automatically keeping constant the vehicle height of a commercial vehicle with air suspension.

BACKGROUND OF THE INVENTION

Level control valves of this type have an adjustment drive which scans the height of the vehicle structure above the vehicle axle and relays a correction value to the level control valve in order to be able to keep a constant vehicle height despite different loading of the vehicle structure. The adjustment drive is often constructed as swivelable actuation lever, the swivel movement of which is converted to a translational movement of the valve tappet which, with a double valve body, forms an outlet valve. An inlet valve is formed between the double valve body and an edge constructed as seat. The inlet and outlet valves serve for admitting air to and discharging air from the air suspension bellows. An arbitrary raising and lowering is not possible with level control valves of this type; in contrast, the control is inevitably effected in dependence on the adjustment drive.

A level control valve of the type described at the beginning is known from German Patent 3,716,436. This level control valve has the customary inlet and outlet valve, via which the admission of air to and discharge of air from the connected air suspension bellows are effected with small strokes of the valve tappet. With large strokes, the longitudinal throttle changes its cross-section and a largely unthrottled admission of air to and discharge of air from the downstream air suspension bellows are effected. Insofar as a plurality of air suspension bellows are connected to a level control valve, a transverse throttle function is also fulfilled, via which, insofar as air bellows are connected on different sides of the vehicle, any rolling deflections occurring when the vehicle turns are kept within limits. In order to allow an even more rapid discharge of air from the air suspension bellows if, for example in container operation, a relatively large load is lifted from the vehicle in a short time, or even in the unloading of goods to be dumped, it is known to arrange a second outlet valve on the level control valve. However, this second outlet valve cannot be actuated arbitrarily either, but in dependence on the adjustment drive of the level control valve. For arbitrary raising and lowering, the level control valve is interconnected with an alternating-load valve within a system in a single or multiple arrangement, it being possible for the alternating-load valve to be controlled electrically. However, the system becomes complicated by the use of an alternating-load valve and one or more level control valves. Additionally, appropriate line connections must be provided between the valves.

German Patent 3,445,579 also shows a control system for the arbitrary raising and lowering of the vehicle structure of vehicles with air suspension, in which control system an alternating-load valve in the form of a pilot valve and corresponding level control valves are likewise used. The pilot valve indeed allows the actuation of the positions stop, raise, lower and drive and thus fulfills all the necessary functions. However, in this case too, the outlay is substantial.

There are various operating states of commercial vehicles with air suspension, in which the customary functions of a level control valve must be fulfilled, for example a defined longitudinal and transverse throttle characteristic with small strokes in comparison to large strokes, and, for example, an adjustability of the close-off position. However, it is not always necessary for air to be able to be admitted to and discharged from the air suspension bellows arbitrarily rapidly in the sense of the use of an alternating-load valve. Thus it is sufficient, for example for commercial vehicles to be transported in ferry operation, to provide an arbitrary lowering possibility for the vehicle structure while the admission of air can also be effected more slowly via the normal inlet valve of the level control valve. With semi-trailers and trailers it is sometimes desirable to carry out the loading and unloading operation of goods in the lowered position of the vehicle structure. With truck trailers it can be desirable to lower the towing vehicle for rapid removal of the semitrailer. Even the rapid lowering of the semitrailer itself may be sensible in some situations.

Setting out from these situations, the problem arises of providing a level control valve having longitudinal and, if appropriate, transverse throttle characteristics, with which level control valve it is possible to lower the structure or vehicle frame of a commercial vehicle arbitrarily and rapidly without the use of an additional alternating-load valve.

According to the invention, this is achieved in that the level control valve has a shutoff and outlet valve which acts independently of the adjustment drive and is of large cross-section for the rapid lowering of the vehicle structure, and in that, for each line leading to an air suspension bellows, a bypass line is provided which leads from said line to the shutoff and outlet valve of large cross-section, in which bypass line there is arranged in each case a non-return valve which opens in the direction of the shutoff and outlet valve. Thus a shutoff and outlet valve of large cross-section is arranged integrated in the level control valve, specifically a shutoff and outlet valve of the type which acts independently of the adjustment drive, that is to say can be arbitrarily actuated or controlled. The details of the shutoff and outlet valve can be constructed in a variety of ways, for example as directly actuatable valve within the level control valve or, with the advantages of remote control, as servo controlled valve. Important factors are, on the one hand, the construction of large cross-section for the rapid venting and, on the other hand, a shutoff function in respect of an advanced part of the storage line against simultaneous venting of the storage line and well.

Despite integration of a shutoff and outlet valve of large cross-section in the level control valve, the constructional outlay for this level control valve is only slightly greater. The shutoff and outlet valve can be arbitrarily controlled independently of the position of the adjustment drive, i.e. the position of the adjustment drive has no effect on the shutoff and outlet valve. Of course, in a servo-controlled shutoff and outlet valve it is necessary in some way to feed the corresponding control pulse to the shutoff and outlet valve of the level control valve. In particular in the sense of a remote control, this is necessary and sensible if the level control valve, as often happens, is installed approximately in the longitudinal mid-axis of a vehicle below the vehicle structure. The bypass line or the bypass lines bypass the normal inlet and outlet valve on the level control valve. They connect the port or the line which leads to the air suspension bellows to the storage line to the level control valve. Thus likewise large cross-sections can and should be implemented in the bypass lines in order to allow the rapid venting via the shutoff and outlet valve. As a result of the arrangement of the non-return valve(s), the transverse throttle function possibly implemented at the level control valve during normal driving continues to be effective. The rapid lowering possibility of the vehicle structure does not otherwise act in a disturbing manner on the longitudinal throttle characteristic, that is to say for the throttled admission and discharge of air with small strokes and for the unthrottled admission and discharge of air with large strokes.

The new level control valve is considerably less complicated in comparison to the use of one or more level control valves in conjunction with an alternating-load valve. For many applications, a rapid lowering of the vehicle structure is sufficient; it is not absolutely necessary also to allow a rapid raising again. The positioning of the normal structure height in relation to the axles can readily be effected via the inlet valve which is present in any case.

It is particularly advantageous if the shutoff and outlet valve of large cross-section is constructed as rapid-release valve and consequently has a valve body which closes off the seat of the associated outlet valve under prestress, acts under pressure from the storage line as overflow valve to the inlet valve and, when the storage pressure is removed, shuts off the overflow valve under pressure in the opposite direction and opens the associated outlet valve. In this case, in this servo-controlled construction of the shutoff and outlet valve, a diaphragm or a piston-type closure piece is provided which is expediently guided with an overflow sleeve in a bore hole in the housing of the level control valve and which cooperates with the associated outlet seat, from which a venting channel feeds either directly to the atmosphere or to the atmosphere via the outlet orifice provided in any case at the level control valve. A rapid-release valve of this type provides considerably large cross-sections for the venting.

The new level control valve can be interconnected within a system having a pilot valve which is arranged in the storage line which is advanced to the level control valve. The pilot valve can be electrically or manually actuatable and has its own venting arrangement. It is understood that a plurality of level control valves can also be arranged downstream from a pilot valve of this type. However, it is also possible to arrange a solenoid valve on the housing of the level control valve and connected in the storage line, it being possible for the shutoff and outlet valve to be controlled independently of the adjustment drive via the electrical actuation of said solenoid valve. An electrical actuation of this type requires little outlay and allows the level control valve also to be readily arranged in the longitudinal axis of the vehicle below the vehicle structure. It is also possible in a simple manner to implement a height restriction on the level control valve via the arrangement of a solenoid valve. This merely additionally requires a sensor which is activated when a certain height of the structure above the vehicle axles is exceeded and it passes a signal to the solenoid valve in the sense of a rapid lowering of the vehicle structure.

The shutoff and outlet valve can have its own vent orifice on the housing of the level control valve, which vent orifice is then likewise designed to have a correspondingly large cross-section. However, it is also possible to provide a corresponding connection channel in the housing of the level control valve, which connection channel leads from the shutoff and outlet valve to the outlet orifice of the level control valve which is normally already provided.

The shutoff and outlet valve can be inserted in the storage line leading to the inlet valve. Its shutoff function is then particularly important in the sense of preventing the simultaneous venting of the storage line as well.

A plurality of ports can also be provided, each having a line leading to an air suspension bellows and each having a bypass line leading to the shutoff and outlet valve of large cross-section, each having a non-return valve. Despite this multiple arrangement, the transverse throttle characteristic is not eliminated.

The bypass line can branch off in the region of the port for the line leading to the air suspension bellows and have a larger cross-section than the bore hole leading to the inlet valve and to the outlet valve. This also serves for maintaining the transverse throttle function.

The solenoid valve can be constructed and switched in such a way that it produces the connection in the storage line in the currentless state. Thus it is ensured that, in the case of a power failure, the vehicle structure always remains at the normal vehicle height or is returned to this normal position. However, application possibilities are also conceivable, in which the inverse switching could be advantageous.

BRIEF DESCRIPTION OF THE DRAWINGS

The invention is explained in greater detail and described with reference to several exemplary embodiments.

DETAILED DESCRIPTION

Figure 1:
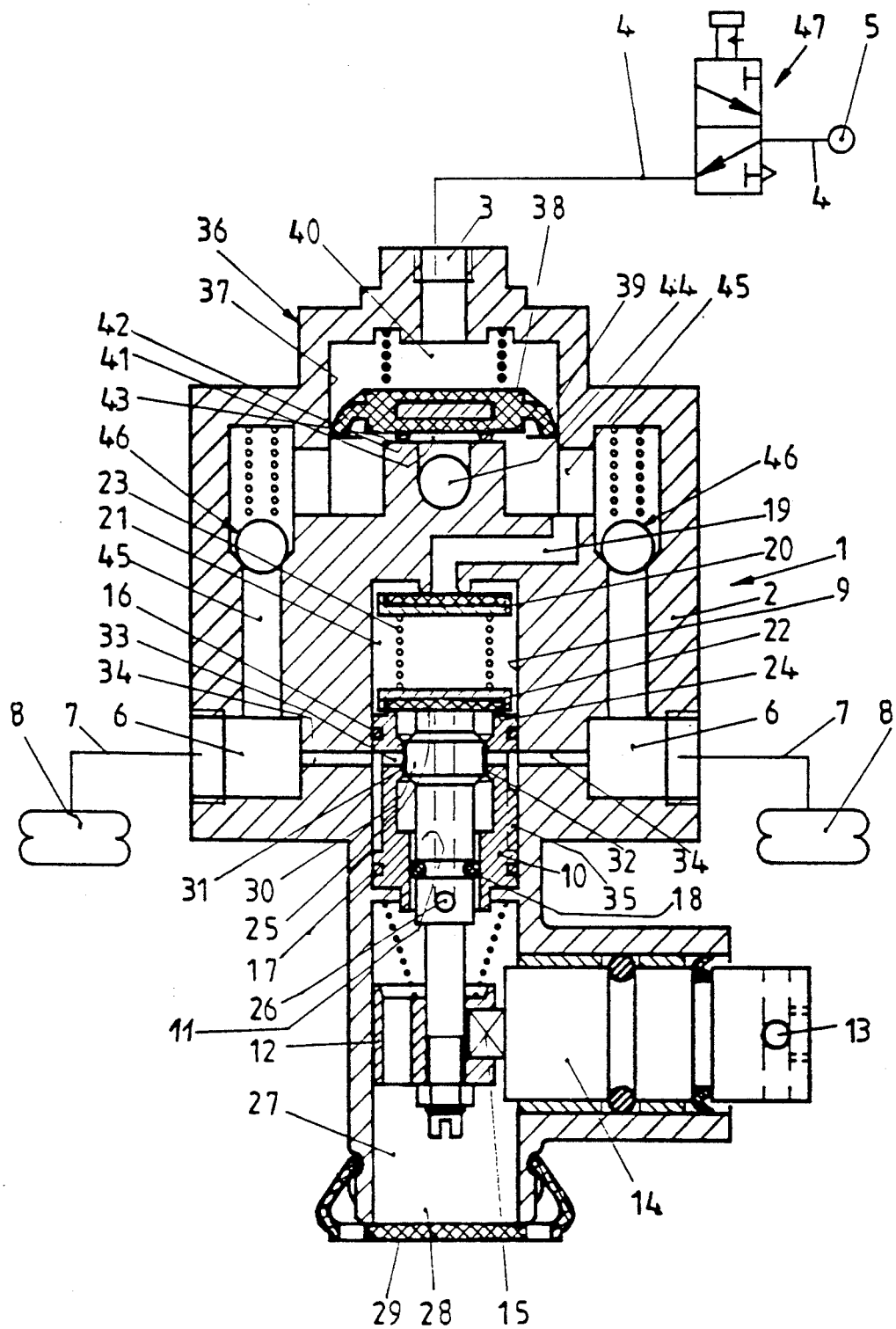
FIG. 1 shows a longitudinal section through a first embodiment of the level control valve.

The level control valve 1 illustrated in FIG. 1 has a housing 2 which is expediently composed of many parts and which has a port 3, to which a storage line 4 is led from a source 5 of compressed air, for example a compressed-air storage container. Furthermore, there are on the housing 2 two ports 6 each for an air suspension bellows line 7 which leads in each case to an air suspension bellows 8.

Provided in the interior of the housing 2 is a bore hole 9, in which an insert body 10 is mounted in a sealing manner, through which a valve tappet 11 extends which is connected at its lower end to a guide piece 12, the translational movement of which is brought about by an adjustment drive. The adjustment drive has an actuation lever 13 which scans the construction height in relation to the axles and transmits a corresponding rotary movement onto a shaft 14 having an eccentric member 15 which engages in the guide piece 12.

The insert body 10 has two seals 16 and 17, by means of which it is mounted in the bore hole 9 in a sealing manner. The insert body 10 can be arranged so as to be axially displaceable for the realization of an adjustable close-off position. Inversely, it is also possible, as illustrated, to design the valve tappet 11 to be adjustable in relation to the guide piece 12. A seal 18 serves for sealing off the valve tappet 11 in the insert body 10.

The storage line 4 continues in the housing 2 of the level control valve 1 in a line section 19 which leads via a non-return valve 20 to a storage chamber 21, in which a double valve body 22 is arranged. The double valve body 22 and the valve body of the non-return valve 20 are loaded via a common spring 23. The insert body 10 has a projecting edge 24 facing the double valve body 22, which forms a valve inlet seat that engages with double valve body 22. Thus the inlet valve 22, 24 is formed here. Furthermore, the valve tappet 11 bears at its upper end an outlet seat 25, with the result that the outlet valve 22, 25 of the level control valve 1 is formed here. For the purposes of venting, the tappet 11 is of hollow construction and is penetrated by a channel 26 which opens out into a space 27, the vent orifice 28 of which is covered by a flutter valve 29. The vent orifice is the normal vent orifice of the level control valve 1.

The valve tappet 11 has in the region illustrated a local thickening 30 and the insert body 10 has at the assigned place a constricted region 31. The thickening 30 and the constricted region 31 together form an annular gap 32, the throttle effect of which is maintained in the longitudinal and transverse directions as long as there is a corresponding covering. Due to the dimensioning of the annular gap 32 in respect of its radial and axial shape, a longitudinal throttle is provided on the one hand for admission and discharge of air with small strokes of the valve tappet 11. On the other hand, the transverse throttle function is permitted. With large strokes, both the longitudinal throttle and the transverse throttle function are switched off or eliminated. Extending from the annular gap 32 in the constricted region 31 through the insert body 10 are radial bore holes 33 which continue in the housing 2 in radial bore holes 34 which each lead to a port 6. The insert body 10 has sealing-off regions 35, arranged accordingly over the circumference, with the result that, at this point, there is no implementation of a circumferential annular groove, but the air is forced to flow via the respective port between the bore holes 33 and 34, with the result that the transverse throttle function is ensured.

A shutoff and outlet valve 36 is provided in the storage line 4, 19 which leads to the storage chamber 21. For this purpose, a valve body 38 is mounted so as to be displaceable in a cylindrical bore hole 37, which valve body has an overflow lip 39 which, in the bore hole 37, separates an inflow chamber 40 from an outflow chamber 41. The overflow lip 39 permits the overflow of storage air from the inflow chamber 40 into the line section 19. The valve body 38 has a projecting edge 42 which, with a seat 43, forms an outlet valve 42, 43 of large cross-section which encloses the outflow chamber 41. In permanent connection with the outflow chamber 41 is an outlet 44 which leads to the atmosphere. This outlet 44 can be the second orifice leading to the atmosphere of the level control valve in addition to the vent orifice 28. However, it is also possible to provide in the housing 2 a connection channel (not illustrated) between the outflow chamber 41 and the space 27, via which connection channel the venting can be effected via the outlet valve 42, 43, with the result that only a single orifice is formed on the housing 2. The overflow lip 39 also forms a type of non-return valve and, in any case, shuts off the line section 19 from the storage line 4 in the sense of preventing a backflow.

Provided between the shutoff and outlet valve 36 and each port 6, to which a line 7 leading to an air suspension bellows 8 is connected, there is in each case a bypass line 45, in which a non-return valve 46 is arranged in each case which opens in the sense of discharging air from the air suspension bellows 8 and has its closure function in the opposite direction.

Arranged in the storage line 4 is a manually actuatable pilot valve 47 which has its own venting arrangement and can be actuated into the two positions illustrated, with the result that, by this means, a control pulse can be arbitrarily emitted for a rapid pressure drop in the air suspension bellows 8.

The mode of functioning of the level control valve is described below. In the normal traveling position, the pilot valve 47 is in the position illustrated, i.e. compressed air flows from the source 5 of compressed air via the storage line 4 to the port 3 and from there into the inflow chamber 40, with the result that the valve body 38 is correspondingly loaded on its effective surface and displaced. The outlet valve 42, 43 closes and compressed air from the storage flows via the overflow lip, the line section 19 and via the opening non-return valve 20 into the storage chamber 21. The inlet valve 22, 24 and the outlet valve 22, 25 are closed, with the result that the close-off position is assumed. If the vehicle construction is not yet at the normal height, the inlet valve 22, 24 opens by the valve tappet 11 being raised and a throttled admission of air to the air suspension bellows 8 is effected via the longitudinal throttle at the annular gap 32 and via the respective mutually adjoining bore holes 33 and 34 and, finally, the lines 7 to the air suspension bellows 8. During normal travel, impacts and oscillations occur which lead to the actuation lever 13 being slightly swivelled. By this means, the valve tappet 11 executes small strokes which, depending on the direction, lead to the inlet valve 22, 24 or the outlet valve 22, 25 being opened. In this case, too, air is passed to the air suspension bellows 8 or discharged from the latter in a throttled manner. In the case of larger strokes, the throttle effect in the longitudinal direction in the annular gap 32 changes by a different covering occurring or the covering finally being completely removed, with the result that an unthrottled admission and discharge of air can be effected, however not arbitrarily but in dependence on the swivel movement of the actuation lever 13. This situation may occur when a comparatively heavy load is loaded onto the commercial vehicle or removed from the latter. When the vehicle turns, the annular gap 32 fulfills its transverse throttle function. The inlet valve 22, 24 and the outlet valve 22, 25 are closed. It is attempted by loading the air suspension bellows 7 on the outer side of the curve, to displace compressed air from the corresponding air suspension bellows 8 into the air suspension bellows 8 on the side of the vehicle on the inner side of the curve. This is only possible via the transverse throttle at the annular gap 32 since one of the two non-return valves 46 has its shutoff position in the corresponding throughflow direction. The transverse throttle characteristic is thus maintained.

If, in contrast, the vehicle structure is to be lowered arbitrarily, it is necessary to displace the pilot valve 47 into its other position (not illustrated in FIG. 1), by which means the part of the storage line 4 leading from the source 5 of compressed air is blocked and the part of the storage line 4 leading to the port 3 is vented. By this means, the pressure in the inflow chamber 40 is relieved and the valve body 38 of the shutoff and outlet valve 36 moves upward by the outlet valve 42, 43 being opened. Compressed air from both air suspension bellows 8 can then flow off via comparatively large cross-sections in the lines 7, the ports 6 and the bypass lines 45 via the respectively opening non-return valves 46 into the outflow chamber 41 and from there via the outlet 44 into the atmosphere. The shutoff and outlet valve 36 is constructed in this case as rapid-release valve and it has the correspondingly large cross-sections. The vehicle structure is thus lowered rapidly. In ferry operation, the commercial vehicle can consequently be taken on a ferry; it can be loaded at a ramp in the lowered position. It is also possible to uncouple a semitrailer rapidly by lowering the towing vehicle or carry out similar operations.

If the normal traveling position and thus the normal height of the vehicle structure above the axles is to be brought about, the pilot valve 47 is merely returned to its initial position illustrated in FIG. 1. Thus compressed air from the storage passes from the source 5 of compressed air via the storage line 4 to the port 3 and the inflow chamber 40, with the result that the shutoff and outlet valve 36 closes its outlet valve 42, 43 and consequently compressed air from the storage again passes into the storage chamber 21. Since the vehicle structure was lowered, the actuation lever 13 is in a swivel position, in which the valve tappet 11 is raised, with the result that the outlet valve 22, 25 is closed and the inlet valve 22, 24 is opened. The longitudinal throttle effect in the annular gap 32 is switched off and the admission of air to the air suspension bellows 8 takes place in an unthrottled manner via the normal inlet valve 22, 24, but, of course, via comparatively small cross-sections of the bore holes 33 and 34. The admission of air until the normal structure height is reached will consequently indeed take up a longer period than the comparatively rapid lowering. However, this period is not disturbingly long and it can readily be tolerated. A rapid admission of air via large cross-sections—comparable to those of the discharge of air when the vehicle structure is lowered—is not necessary.

Figure 2:
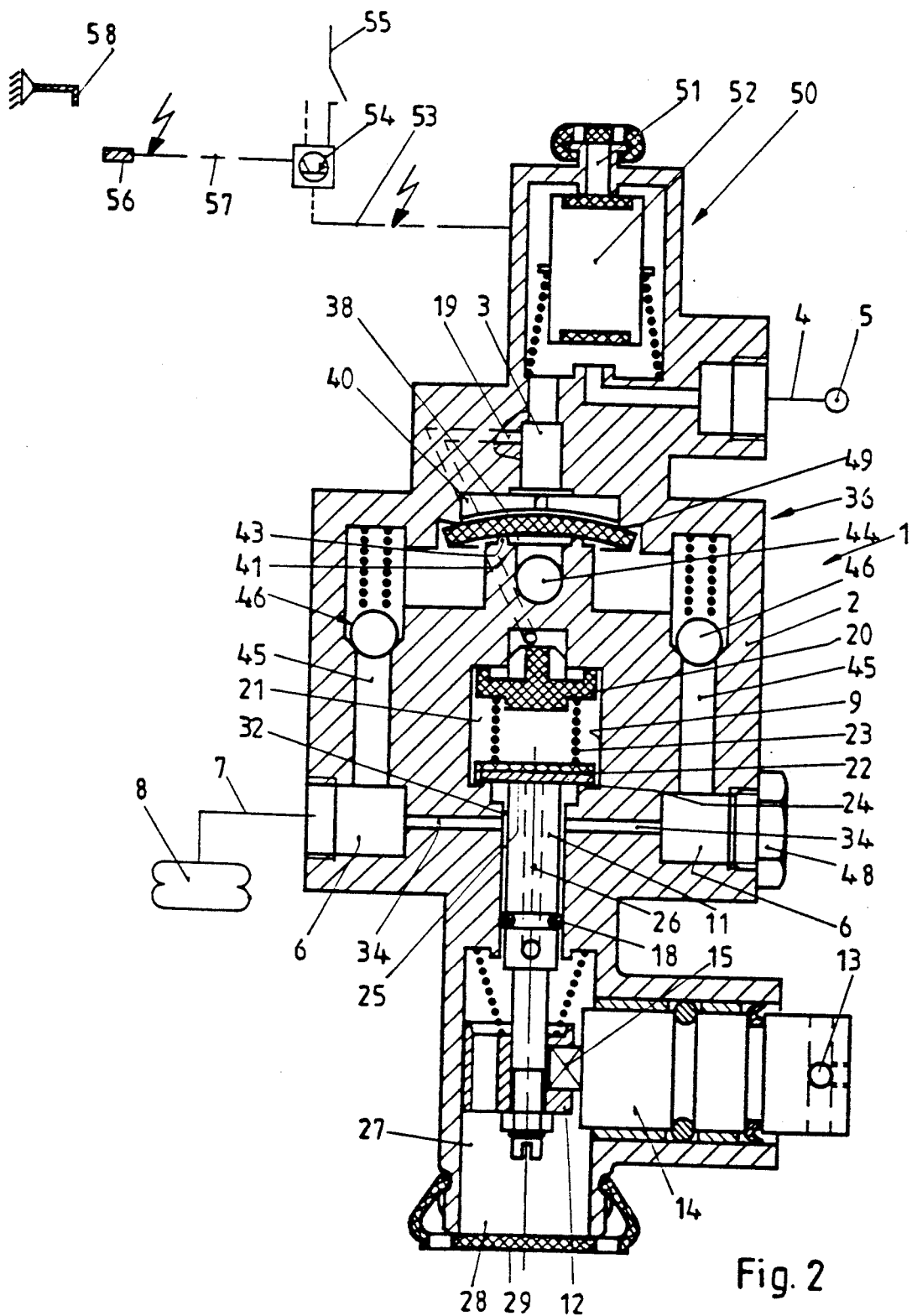
FIG. 2 shows a longitudinal section through a second embodiment of the level control valve and FIG. 3 shows the illustration of a system having three level control valves in accordance with FIG. 1.

FIG. 2 illustrates a second embodiment of the level control valve 1 which corresponds largely to the embodiment according to FIG. 1. Although in this case the arrangement of an insert body 10 has been omitted, the close-off position is also adjustable in this case. A line 7 which leads to an air suspension bellows 8 is only connected at the one port 6 while the other port 6 is sealed off by a closure 48. In this case, the valve body 38 of the shutoff and outlet valve 36 is constructed as a movable plate made of flexible material which is installed under prestress between the seat 43 and an edge 49 on the housing 2. The line section 19, which produces the connection between the port 3 and the storage chamber 21, bypasses the shutoff and outlet valve 36 in this case. Thus it is also visible that the valve body 38 could also be provided, for example, as a tensioned diaphragm, with the result that it is permanently pressed against the edge 49 and never opens at this point. Of course, the diaphragm of the valve body 38 must be movable in such a way that the outlet valve, which is formed in this case between the seat 43 and the valve body 38, can open and close properly.

Placed on the housing 2 of the level control valve 1 is a solenoid valve 50, via which the storage line 4 is led to the port 3 in the manner illustrated. The solenoid valve 50 has its own vent orifice 51. Electric current is applied to its core 52 via a line 53, with the result that the arbitrary control pulse can consequently be relayed. An electronic control unit 54, upstream of which either a switch 55 can be arranged or which is itself merely constructed as a switch. If a height restriction is to be implemented at the same time, it is sensible to connect a corresponding sensor 56 to the control unit 54 via a line 57, which sensor cooperates with a height mark 58.

The functioning of the level control valve according to FIG. 2 is described below. Current is applied to the solenoid valve 50 by arbitrary closing of the switch 55, with the result that its core 52 shuts off the storage line 4 from the source 5 of compressed air and connects the port 3 to the atmosphere via the vent orifice 51. Thus the inflow chamber 40 and the line section 19 up to the non-return valve 20 are vented. The shutoff and outlet valve 36 opens its outlet valve 38, 41 and connects the two bypass lines 45 to the outflow chamber 41 and the outlet 44, the non-return valve 46 in the one bypass line 45, which belongs to the connected air suspension bellows 8, opens and an accelerated discharge of compressed air from the air suspension bellows 8 takes place via the large cross-sections of the bypass line 45 and the shutoff and outlet valve 36. As is visible, the invention is independent of whether one or more air suspension bellows 8 are connected to a level control valve 1. The invention is also independent of whether the normal transverse and longitudinal throttle characteristics have a different throttle effect with small strokes of the valve tappet 11 in comparison with large strokes of the valve tappet 11.

Figure 3:
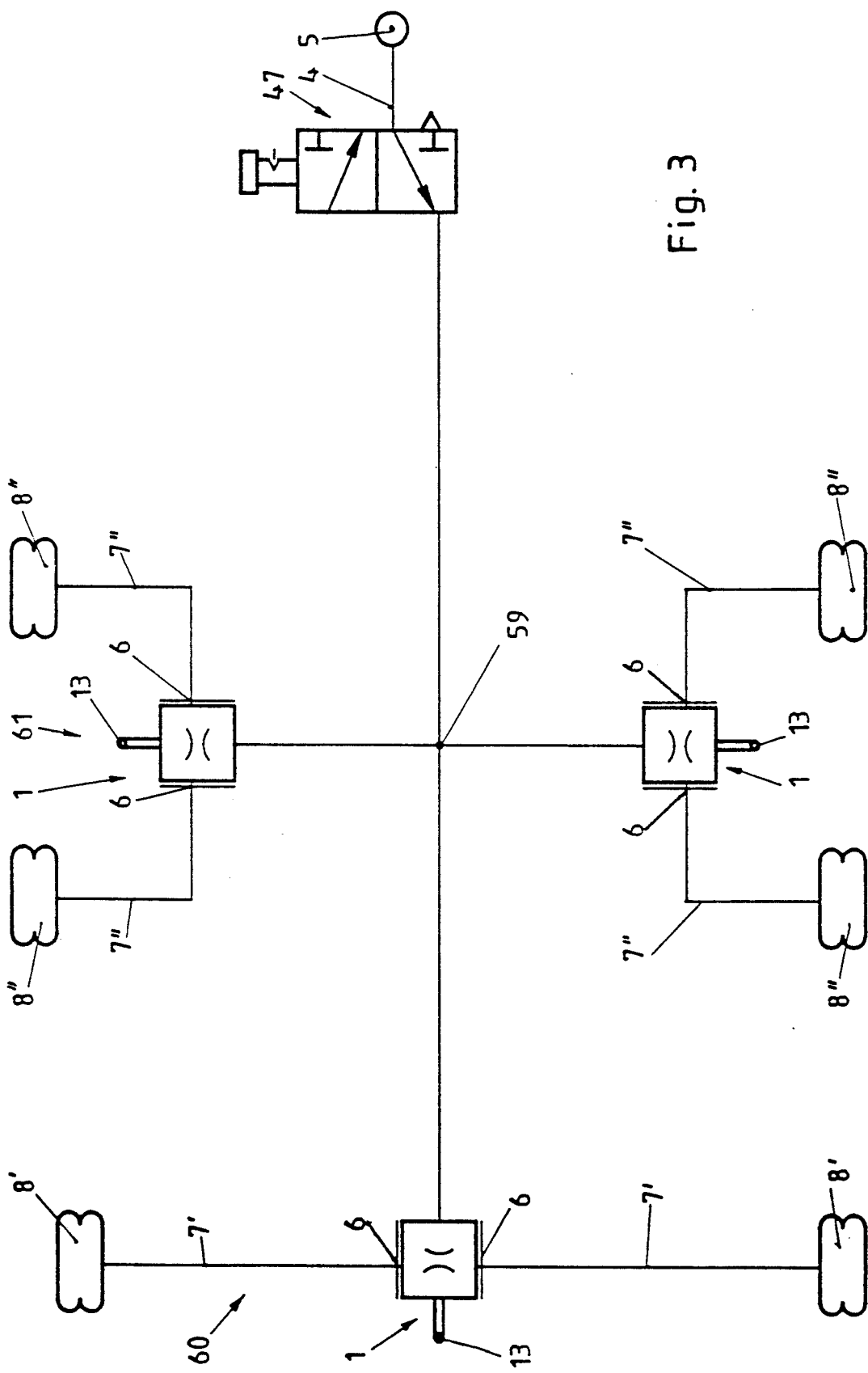

FIG. 3 illustrates a circuit diagram for a commercial vehicle, e.g. in the form of a trailer. The storage line 4 leads from the source 5 of compressed air to the pilot valve 47 and continues via a junction 59, with the result that, in this case, three level control valves 1 are connected. A front axle 60 is illustrated to which the two air suspension bellows 8' on the right and left sides of the vehicle are assigned. The level control valve 1 is arranged in the longitudinal center plane of the vehicle. Furthermore, the vehicle has a rear axle 61 which is constructed as a double axle, to which the air suspension bellows 8" are assigned which can be actuated by two level control valves 1 separately in each case for the left and right sides of the vehicle via the lines 7". These level control valves 1 can also consequently have a "transverse throttle characteristic" which becomes effective during braking and accelerating during the dynamic shifting of the axle load. It is visible how, by switching over the pilot valve 47, which must be arranged at an accessible point on the commercial vehicle, all three level control valves 1 can be actuated for the rapid lowering of the vehicle structure, with the result that the discharge of air from the air suspension bellows 8', 8" takes place.

I claim:
1. A level control valve for automatically keeping constant the vehicle height of a commercial vehicle with air suspension, the level control valve comprising
   a housing (2),
   an inlet seat (24) in said housing,
   a spring loaded double valve body within said housing biased toward said inlet seat,
   a hollow valve tappet (11) movable toward sealed engagement with said double valve body (22), an adjustment drive (14) responsive to the change in vehicle height for moving said valve tappet (11) toward or away from sealing engagement with said double valve body (22), a bellows port (6) provided on said housing for fluid communication with an air suspension bellows line (7) leading to an air suspension bellows (8) of the vehicle, an inlet port (3) in said housing for fluid communication with a source of compressed air (5) and leading to said inlet seat (22) in said housing, a bore hole connection (33, 34) between said bellows port (6) and said spring loaded double valve body (22), a shutoff and outlet valve (38) adapted to act independently of said adjustment drive for rapid lowering of the vehicle structure, and an outlet seal (43) in said housing adjacent said shutoff and outlet valve, a bypass line (44, 45) which leads from the air suspension bellows line (7) to the shutoff and outlet valve (38), said bypass line provided with a non-return valve (46) which opens in the direction of the shutoff and outlet valve (38).

2. The level control valve as claimed in claim 1, wherein said shutoff and outlet valve (38) is constructed as a quick release valve including a valve body which closes off said outlet seat (43) of the shutoff and outlet valve under prestress, acts under pressure from the source of compressed air as an overflow valve to the inlet valve of the double valve body and, when the pressure from the source of compressed air is removed, shuts off the overflow valve under pressure in the opposite direction and opens the associated shutoff and outlet valve.

3. The level control valve as claimed in claim 1, and further comprising a solenoid valve (47) inserted between said inlet port and the source of compressed air, the shutoff and outlet valve being controllable independently of the adjustment drive via the electrical actuation of said solenoid valve.

4. The level control valve as claimed in claim 3, wherein the solenoid valve (47) is constructed and switched in such a way that is produces a fluid communication connection between said inlet port and the source of compressed air in the currentless state.

5. The level control valve as claimed in claim 1, wherein said shutoff and outlet valve has its own vent orifice (44) in the housing.

6. The level control valve as claimed in claim 1, wherein said shutoff and outlet valve is inserted in said housing between said inlet port and the inlet valve of the double valve body.

7. The level control valve as claimed in claim 1, wherein there is provided a plurality of bellows ports (6) each including an air suspension bellows line (7) and each including a bypass line (45) leading to the shutoff and outlet valve (38) with each of the bypass lines having a non-return valve (46).

8. The level control valve as claimed in claim 1, wherein the bypass line (45) branches off in the region of the bellows port (6) from the air suspension bellows line (7) and has a larger cross section than the bore hole (33, 34).

9. A level control valve for stabilizing the chassis height of a motor vehicle with a pneumatic shock absorption system, the level control valve comprising:

a housing defining a central passageway therethrough, an inlet port in said housing for fluid communication between a source of compressed air and the central passageway of said housing, an exhaust port in said housing for fluid communication between the central passageway of said housing and atmosphere about said housing, a valve seat in the central passageway, a double valve body in the central passageway adjacent said valve seat, a bellows port in said housing for fluid communication with an air suspension bellows line leading to the pneumatic shock absorption system of the vehicle, a bore hole connection adjacent said valve seat for fluid communication with said bellows port, a hollow valve tappet movable toward sealed engagement with said double valve body, an adjustable drive responsive to the change in vehicle height for moving said valve tappet toward or away from sealing engagement with said double valve body, a shutoff and outlet valve adapted to act independently of said adjustment drive and having a larger cross section than the bore hole for rapid lowering of the vehicle structure, an outlet seat in said housing adjacent said shutoff and outlet valve, and a bypass line leading from said bellows port to said shutoff and outlet valve, said bypass line provided with a non-return valve that opens in the direction of said shutoff and outlet valve.

* * * * *